Patented Feb. 7, 1950

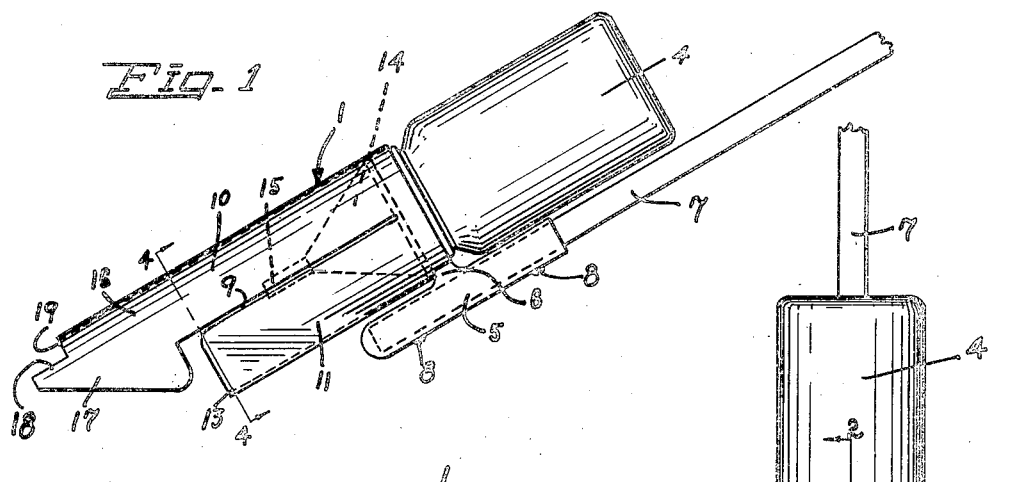
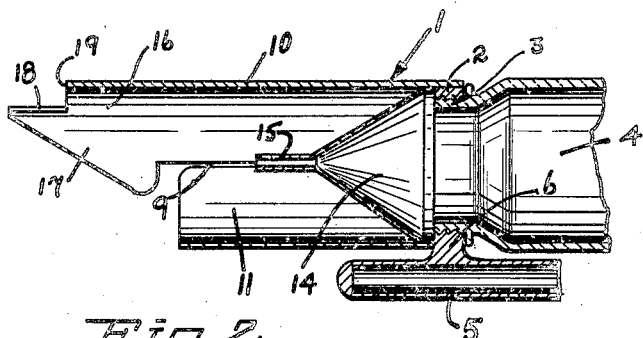
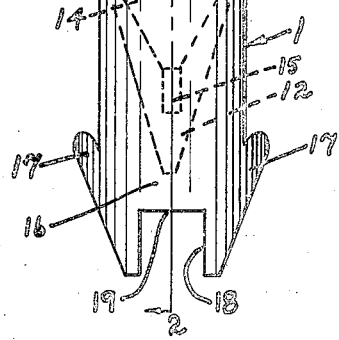
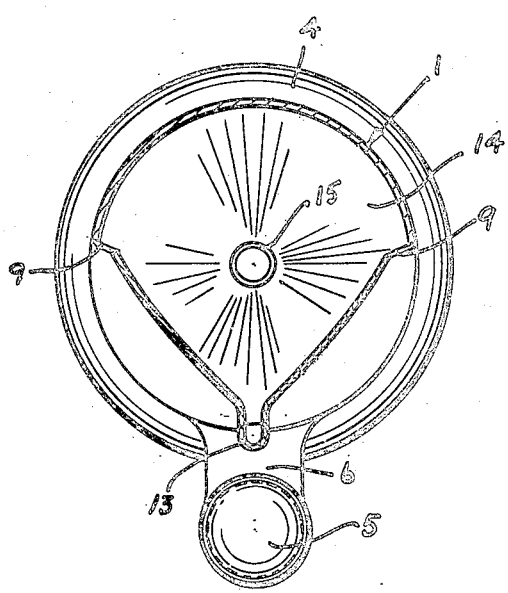

2,496,573

UNITED STATES PATENT OFFICE 2,496,573

FERTILIZER DISTRIBUTOR

William B. Aspinwall, Spokane, Wash.

Application April 27, 1946, Serial No. 665,601

6 Claims. (Cl. 111—82)

This invention relates to a fertilizer distributor and it is one object to provide a device of this character by use of which a trench may be formed in the ground along a side of a row of growing plants and fertilizer deposited in the trench which is then covered at the rear of the device.

Another object of the invention is to provide a fertilizer distributor which is particularly adapted for distributing fertilizer in a small home garden and may be pulled along the ground and a trench opened to receive fertilizer flowing from a fertilizer container, a blade being provided for filling in and smoothing the trench.

Another object of the invention is to provide a fertilizer distributor wherein the fertilizer container is removably mounted and disposed over a socket open at its front end to receive a handle and thus allow the handle to extend forwardly beyond the container in position to be readily grasped during use of the distributor.

Another object of the invention is to provide a distributor with a funnel shaped device for controlling flow of powdered fertilizer from the container and directing the fertilizer into a trench formed in the ground as the device is pulled forwardly by a person grasping the handle which projects forwardly beyond the container.

Another object of the invention is to so form the blade at the rear of the upper portion of the body that when the distributor is held by the handle and pulled forwardly sloping edges along opposite sides of the blade will be disposed parallel to the surface of the ground but embedded therein and converge rearwardly so that they move dirt into the trench and fill the trench.

Another object of the invention is to provide a fertilizer distributor which is simple in construction, and capable of being readily transported from one place to another.

The invention is illustrated in the accompanying drawings wherein:

Fig. 1 is a side elevation of the improved fertilizer distributor.

Fig. 2 is a sectional view taken longitudinally of the distributor along line 2—2 of Figure 3.

Fig. 3 is a top plan view of the distributor.

Fig. 4 is a view upon an enlarged scale taken transversely through the distributor along line 4—4 of Figure 1.

This improved fertilizer distributor is intended for use by persons having small home gardens. The body 1 of the distributor is formed of sheet metal and of substantially tubular formation. A metal ring 2 is firmly mounted in the front end of the body and internally threaded to receive the threaded neck 3 of a container 4 which projects forwardly from the body in longitudinal alignment therewith. Since the container is screwed into the ring it may be easily removed for filling when necessary. The lower portion of the ring carries a socket 5 connected with the ring by a shank 6 and this socket extends longitudinally of the body and the container is open at its front end to receive a bar or handle 7. The handle may be formed of wood or other suitable material and of any length desired which will permit a person to grasp the handle and draw the device forwardly along the ground substantially parallel to a row of growing vegetables. Screws 8 hold the handle in the socket.

The body 1 is slit longitudinally at opposite sides, as shown at 9, to provide the body with upper and lower portions 10 and 11 which are connected with each other by the annular forward end portion of the body in which the ring 2 is mounted. The lower portion 11 of the body has its side portions bent towards each other to form a trough 12 which is substantially V-shaped in cross section, as shown in Figure 4, and along the rear extremity of its lower portion the trough is crimped to form a U-shaped bill 13 of such depth that when the distributor is drawn forwardly along the ground the bill will serve as a trench opener and form a trench in the ground. A funnel-shaped baffle or checking member 14 is secured about the rear edge face of the ring 2 and extends rearwardly therefrom with its spout disposed axially of the body, the length of the checking member being such that the rear end of its spout terminates forwardly of the rear end of the trough in such relation to the bill 13 that during use of the distributor powdered or granular fertilizer in the container will be discharged therefrom through the checking device and flow from the spout 15 in a stream which enters the bill and flows through the bill into the trench. If it were not for the checking device too much fertilizer would be discharged from the container and excess quantities delivered into the trench.

After the fertilizer has been discharged into the trench, the trench must be filled in and in order to do so the rear end of the upper portion 10 of the body which forms a hood for the trough has been extended rearwardly beyond from the lower portion 11 and shaped to form a blade 16. This blade is substantially triangular when viewed in top plan and has side wings 17. The blade decreases in depth toward its rear end and its side edges extend diagonally so that when the distributor is in use edges of the blade will be disposed horizontally as shown in Figure 1. The side edge portions or wings 17 of the blade are pressed into the ground and since these side edges converge rearwardly dirt under the blade will be guided toward the trench as the distributor is pulled forwardly and fill the trench. A recess 18 is formed midway the width of the blade at the rear end thereof so that dirt may pass through this recess as the distributor is pulled forwardly and this recess has its inner end edge 19 cut straight across in order to smooth a ridge of dirt which will be formed over the trench as the trench is filled to cover fertilizer deposited in the trench. Therefore if rain occurs after fertilizer has been distributed and a trench filled in there will be a ridge of earth over the fertilizer which can settle and insure proper covering of the fertilizer.

Having thus described the invention, what is claimed is:

1. A fertilizer distributor comprising a tubular body having upper and lower longitudinally extending portions, said lower portion having a longitudinally extending bill constituting a trench opener, the upper portion extending rearwardly beyond the rear end of the lower portion and having its rearwardly projecting portion constituting a blade for filling in a trench formed by the bill of the lower portion when the distributor is moved forwardly along the ground, a fertilizer container at the front end of said body open at its rear end for discharge of fertilizer into the body, and a rearwardly tapered member in the body registering with the rear end of the container for controlling flow of fertilizer from the container into the body for deposit into a trench formed by the bill.

2. A fertilizer distributor comprising a tubular body having upper and lower longitudinally extending portions, said lower portion constituting a trough open at its rear end and having a bill along its rear portion for forming a trench in the ground as the distributor is moved forwardly, said upper portion being provided with a blade extending rearwardly beyond the lower portion and having side wings extending in rearwardly converging relation to each other for filling in the trench from opposite sides after deposit of fertilizer therein, a fertilizer container extending forwardly from the front end of said body and open at its rear end, means for controlling flow of fertilizer from the container into the lower portion of the body, a socket under the front end portion of the body extending longitudinally thereof, and a handle engaged in said socket and extending forwardly under the container and projecting forwardly therefrom.

3. A fertilizer distributor comprising a tubular body having upper and lower longitudinally extending portions, said lower portion constituting a trough for forming a trench in the ground as the distributor is moved forwardly, said upper portion being provided with a blade extending rearwardly beyond the lower portion and being tapered rearwardly and decreasing in depth towards its rear end and at its rear end being formed with a longitudinally extending recess formed with a front edge for smoothing dirt scraped into the trench by side portions of the blade as the distributor is moved forwardly and a container at the front end of the body for feeding fertilizer into the lower portion of the body.

4. A fertilizer distributor comprising a tubular body having upper and lower longitudinally extending portions, said lower portion constituting a trough for forming a trench in the ground as the distributor is moved forwardly, said upper portion being provided with a blade extending rearwardly beyond the lower portion, said blade being transversely arcuate and having rearwardly tapered side wings for filling in the trench after deposit of fertilizer wherein, the rear end of the blade being formed with a longitudinal recess having a wall across its inner end for forming a ridge of dirt along the line of the filled-in trench, and a container at the front end of the body for holding fertilizer and delivering fertilizer into the body.

5. A fertilizer distributor comprising a tubular body having upper and lower longitudinally extending portions, said lower portion constituting a trough for forming a trench in the ground as the distributor is moved forwardly, said upper portion being provided with a blade extending rearwardly beyond the lower position and having side wings for filling in the trench after deposit of fertilizer therein, a ring mounted in the front end of said body, a fertilizer container in front of the body having its rear end open and detachably engaged with said ring, a socket carried by said ring, a handle mounted in said socket and projecting forwardly beyond the container, and a baffle carried by said ring for controlling flow of fertilizer from the container into the body.

6. A fertilizer distributor comprising a body open at front and rear ends and having a circular forward portion and being split longitudinally at opposite sides from its rear end to provide an upper hood and a lower trough, said trough having rear portions of its walls bent to form a U-shaped bill at the rear end of the trough constituting a trench opener, said hood extending rearwardly beyond the trough and having its protruding rear portion spread transversely to form a trench-filling blade tapered rearwardly and having longitudinally extending wings along its sides formed with sloping lower edges, the rear end of the blade being formed with a center recess terminating in an inner end edge for smoothing a filled trench, a ring mounted in the forward end of said body and having a neck projecting downwardly from the body, a handle-receiving socket at the lower end of said neck open at its front end, a handle fitting into and extending forwardly from said socket, a fertilizer container forwardly of said body disposed longitudinally thereof over the socket and having a neck at its rear end screwed into said ring to detachably mount the container, and a funnel-shaped baffle mounted in the body about the ring for retarding flow of fertilizer from the container having a tubular spout extending toward the rear end of the body.

WILLIAM B. ASPINWALL.

REFERENCES CITED

The following references are of record in the file of this patent:

UNITED STATES PATENTS

| Number | Name | Date |
| --- | --- | --- |
| 1,689,866 | Erickson | Oct. 30, 1928 |

FOREIGN PATENTS

| Number | Country | Date |
| --- | --- | --- |
| 441 | Great Britain | Feb. 18, 1871 |
| 116,807 | Great Britain | June 27, 1918 |